United States Patent
Amano

(10) Patent No.: US 10,059,337 B2
(45) Date of Patent: Aug. 28, 2018

(54) CRUISE CONTROL APPARATUS

(71) Applicant: TOYOTA JIDOSHA KABUSHIKI KAISHA, Toyota-shi, Aichi-ken (JP)

(72) Inventor: Takashi Amano, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/443,227

(22) PCT Filed: Oct. 16, 2013

(86) PCT No.: PCT/JP2013/078077
§ 371 (c)(1),
(2) Date: May 15, 2015

(87) PCT Pub. No.: WO2014/083955
PCT Pub. Date: Jun. 5, 2014

(65) Prior Publication Data
US 2015/0291161 A1 Oct. 15, 2015

(30) Foreign Application Priority Data

Nov. 28, 2012 (JP) .................. 2012-259646

(51) Int. Cl.
*B60W 30/14* (2006.01)
*B60K 31/00* (2006.01)
(Continued)

(52) U.S. Cl.
CPC .......... *B60W 30/143* (2013.01); *B60K 31/00* (2013.01); *B60L 11/14* (2013.01); *B60L 11/1861* (2013.01);
(Continued)

(58) Field of Classification Search
CPC ........ B60W 30/143; B60W 30/18072; B60W 50/06; B60W 50/10; B60K 31/00;
(Continued)

(56) References Cited

U.S. PATENT DOCUMENTS 5,799,262 A * 8/1998 Suzuki .................. B60K 31/00
180/179
2005/0240319 A1* 10/2005 Sawada .................. B60W 50/10
701/1
(Continued)

FOREIGN PATENT DOCUMENTS

CN 102463906 A 5/2012
JP 2002-227885 A 8/2002
(Continued)

*Primary Examiner* — Khoi H Tran
*Assistant Examiner* — Donald J Wallace
(74) *Attorney, Agent, or Firm* — Hunton Andrews Kurth LLP

(57) ABSTRACT

A cruise control apparatus is provided with: a controlling device configured to start a determination period, which is a period for determining whether or not to continue the intermittent operation mode, on condition that a change amount of the accelerator opening degree exceeds a predetermined change amount, during implementation of the intermittent operation mode, and configured to set an accelerator following period, which is a period for allowing the driver's accelerator operation to follow torque of the vehicle, after an end of the determination period, if it is determined that the intermittent operation mode is to be continued according to a change width of the accelerator opening degree obtained in the determination period.

2 Claims, 2 Drawing Sheets

(51) Int. Cl.

| | | |
|---|---|---|
| *B60L 11/14* | (2006.01) | |
| *B60L 11/18* | (2006.01) | |
| *B60L 15/20* | (2006.01) | |
| *B60W 50/06* | (2006.01) | |
| *B60W 50/10* | (2012.01) | |
| *B60W 30/18* | (2012.01) | |
| *B60K 26/04* | (2006.01) | |
| *B60W 20/00* | (2016.01) | |

(52) U.S. Cl.
CPC ... *B60L 15/2054* (2013.01); *B60W 30/18072* (2013.01); *B60W 50/06* (2013.01); *B60W 50/10* (2013.01); *B60K 2026/046* (2013.01); *B60K 2310/244* (2013.01); *B60K 2310/246* (2013.01); *B60L 2240/12* (2013.01); *B60L 2240/423* (2013.01); *B60L 2240/443* (2013.01); *B60L 2240/486* (2013.01); *B60L 2240/545* (2013.01); *B60L 2240/547* (2013.01); *B60L 2240/549* (2013.01); *B60L 2250/26* (2013.01); *B60W 20/00* (2013.01); *B60W 2030/18081* (2013.01); *B60W 2520/10* (2013.01); *B60W 2540/10* (2013.01); *B60W 2540/103* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01)

(58) Field of Classification Search
CPC .. B60L 11/14; B60L 11/1861; B60L 15/2054; B60L 2260/24; B60L 2260/26
See application file for complete search history.

(56) References Cited

U.S. PATENT DOCUMENTS

| | | | | |
|---|---|---|---|---|
| 2009/0146615 | A1* | 6/2009 | Zillmer | B60K 6/48 322/23 |
| 2010/0025131 | A1* | 2/2010 | Gloceri | B60G 3/20 180/65.28 |
| 2010/0324795 | A1* | 12/2010 | Tsumori | B60K 6/445 701/70 |
| 2011/0029179 | A1* | 2/2011 | Miyazaki | B60K 6/46 701/22 |
| 2012/0123624 | A1 | 5/2012 | Sato et al. | |

FOREIGN PATENT DOCUMENTS

| | | |
|---|---|---|
| JP | 2007-069787 A | 3/2007 |
| JP | 2011-239605 A | 11/2011 |
| JP | 2012-006441 A | 1/2012 |
| JP | 2012-030710 A | 2/2012 |
| JP | 2012-110089 A | 6/2012 |

\* cited by examiner

CRUISE CONTROL APPARATUS

CROSS-REFERENCE TO RELATED APPLICATIONS

This is a national phase application based on the PCT International Patent Application No. PCT/JP2013/078077 filed Oct. 16, 2013, claiming priority to Japanese Patent Application No. 2012-259646 filed Nov. 28, 2012, the entire contents of both of which are incorporated herein by reference.

TECHNICAL FIELD

The present invention relates to a cruise control apparatus configured to control cruise or running of a vehicle such as, for example, an electric vehicle and a hybrid vehicle.

BACKGROUND ART

In this type of apparatus, for example, inertia cruise or coasting is used to improve fuel consumption and power consumption. As this type of apparatus, there is proposed an apparatus configured to control a motor to be braked and driven in a pulse manner in such a manner that a first period and a second period are alternately repeated, wherein a first period allows the motor to be braked and driven by maximum-efficiency motor torque to cruise the vehicle, and a second period allows the coasting of the vehicle without braking and driving the motor (refer to Patent Literature 1).

Alternatively, there is also proposed an apparatus configured to start a control mode in which a clutch is released to cut off power and the vehicle is allowed to coast by an operation in which a driver suddenly releases an accelerator pedal, and configured to release the control mode by an operation for acceleration or deceleration or the like performed by the driver (refer to Patent Literature 2).

Alternatively, there is also proposed an apparatus configured to start coasting control in which the clutch is released to cut off power and the vehicle is allowed to coast when an operating state is in a coasting controllable region defined in advance, and configured to connect the clutch in order to end the coasting control to generate engine brake when an accelerator opening degree becomes less than or equal to an accelerator release determination value during the coasting control (refer to Patent Literature 3).

Alternatively, there is also proposed an apparatus configured to arbitrarily control deceleration including the coasting with small deceleration, on the basis of the driver's selection operation during the deceleration by the driver's accelerator foot-off operation (refer to Patent Literature 4).

CITATION LIST

Patent Literature

Patent Literature 1: Japanese Patent Application Laid Open No. 2012-110089
Patent Literature 2: Japanese Patent Application Laid Open No. 2002-227885
Patent Literature 3: Japanese Patent Application Laid Open No. 2012-030710
Patent Literature 4: Japanese Patent Application Laid Open No. 2007-069787

SUMMARY OF INVENTION

Technical Problem

According to the aforementioned back ground, however, the control mode is switched by using a momentary value of the accelerator opening degree. There is thus a possibility that appropriate control is not performed, such as that the control mode is unintentionally switched due to variations in the accelerator operation by the driver, which is technically problematic.

In view of the aforementioned technical problems, it is therefore an object of the present invention to provide a cruise control apparatus configured to suppress the unintentional switching of the control mode.

Solution to Problem

The above object of the present invention can be achieved by a cruise control apparatus configured to perform an intermittent operation mode, which is a mode for cruising a vehicle in a predetermined vehicle speed range including a vehicle speed that is determined according to an accelerator opening degree while alternately repeating transmission and non-transmission of rotary power generated on a power source of the vehicle to drive wheels, said cruise control apparatus is provided with a controlling device configured to start a determination period, which is a period for determining whether or not to continue the intermittent operation mode, on condition that a change amount of the accelerator opening degree caused by an accelerator operation by a driver of the vehicle exceeds a predetermined change amount, during implementation of the intermittent operation mode, and configured to set an accelerator following period, which is a period for allowing the driver's accelerator operation to follow torque of the vehicle, after an end of the determination period, if it is determined that the intermittent operation mode is to be continued according to a change width of the accelerator opening degree, which is an integrated value of the change amount obtained in the determination period.

According to the cruise control apparatus of the present invention, the cruise control apparatus is configured to perform the intermittent operation mode. The intermittent operation mode is the mode for cruising the vehicle in the predetermined vehicle speed range including the vehicle speed that is determined according to the accelerator opening degree, while alternately repeating the transmission and the non-transmission of the rotary power generated on the power source of the vehicle to drive wheels.

The vehicle may be provided with, for example, only a motor for cruise (i.e. may be an electric vehicle), or provided with the motor for cruise and an engine (i.e. may be a hybrid vehicle), or provided with only the engine, as the "power source".

The "non-transmission of the rotary power" may be realized, for example, by disconnecting the engine and a transmission mechanism via a clutch or the like or by stopping the operation of the engine if the power source is the engine. Moreover, if the power source is the motor for cruise, the "non-transmission of the rotary power" may be realized, for example, by stopping electric power supply to the motor for cruise.

The "predetermined vehicle speed range" may be set as a vehicle speed range in which a vehicle speed variation width with respect to the vehicle speed that is determined according to the accelerator opening degree, which is caused by alternately repeating the transmission and the non-transmission of the rotary power to the drive wheels, does not give discomfort to a vehicle occupant.

The controlling device, which is provided with, for example, a memory, a processor, and the like, starts the determination period, which is the period for determining whether or not to continue the intermittent operation mode, on condition that the change amount of the accelerator opening degree caused by the accelerator operation by the driver of the vehicle exceeds the predetermined change amount, during the implementation of the intermittent operation mode.

The "predetermined change amount" according to the present invention is a value for determining whether or not to start the determination period, and is set as a fixed value in advance or as a variable according to some physical quantity or parameters. The "predetermined change amount" may be set as a change amount in which a vehicle speed change width corresponding to the change amount of the accelerator opening degree exceeds the aforementioned predetermined vehicle speed range, for example, on the basis of a relation between the accelerator opening degree and the vehicle speed, which is obtained by experiences, experiments, or simulations.

The controlling device further sets the accelerator following period, which is the period for allowing the driver's accelerator operation to follow the torque of the vehicle, after the end of the determination period, if it is determined that the intermittent operation mode is to be continued according to the change width of the accelerator opening degree, which is the integrated value of the change amount of the accelerator opening degree obtained in the determination period. The change width of the accelerator opening degree may be an integrated value of the change amount of the accelerator opening degree in at least a partial period of the determination period Here, according to the study of the present inventors, the following matter has been found; namely, if the cruise mode is changed immediately after the accelerator opening degree changes to some extent, the switching of the cruise mode that is not intended by the driver is possibly performed. In addition, there is a possibility that a fuel consumption improving effect cannot be sufficiently obtained. Moreover, if the motor for cruise is used as the power source of the vehicle, there is a possibility of shock when the cruise mode is changed, due to good responsiveness of the motor for cruise.

In the present invention, however, the determination period is started on condition that the change amount of the accelerator opening degree exceeds the predetermined change amount, by the controlling device. Thus, even if the accelerator opening degree changes to some extent, it can be prevented that the intermittent operation mode is immediately switched to another cruise mode. In addition, it is determined whether or not to continue the intermittent operation mode, not according to the momentary change amount of the accelerator opening degree but according to the change width of the accelerator opening degree, which is the integrated value of the change amount of the accelerator opening degree within the determination period. It is thus possible to preferably suppress the switching of the cruise mode that is not intended by the driver.

Moreover, the accelerator following period is set if it is determined that the intermittent operation mode is to be continued. It is thus possible to perform the intermittent operation mode corresponding to the speed according to the accelerator opening degree after the determination period.

In one aspect of the cruise control apparatus of the present invention, said controlling device changes the accelerator following period according to a vehicle speed of the vehicle.

According to this aspect, the fuel consumption can be further improved, which is extremely useful in practice.

The operation and other advantages of the present invention will become more apparent from an embodiment explained below.

DESCRIPTION OF EMBODIMENT

Hereinafter, an embodiment according to the cruise control apparatus of the present invention will be explained with reference to the drawings.

Figure 1:
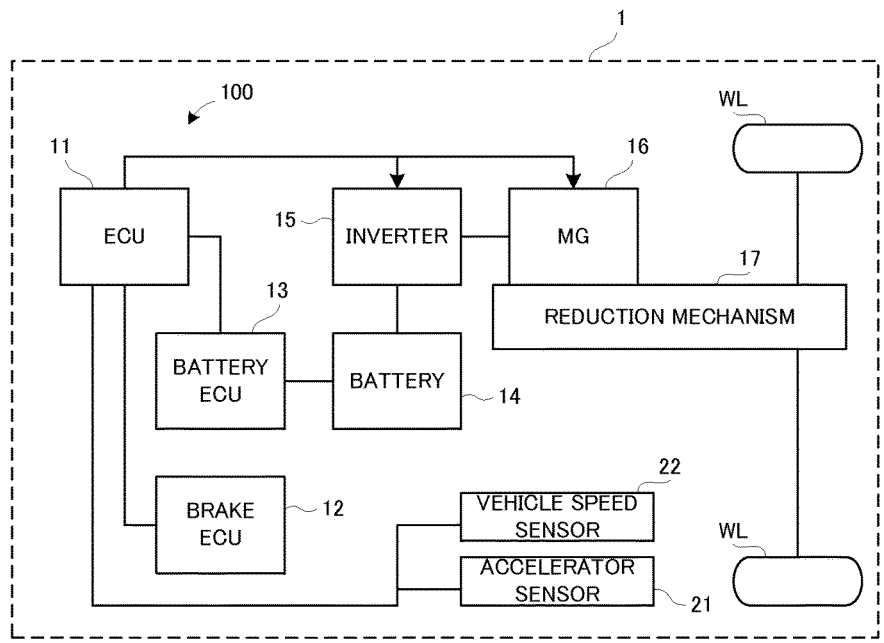
FIG. 1 is a block diagram illustrating a configuration of a vehicle according to an embodiment.

Firstly, a configuration of a vehicle 1 according to the embodiment will be explained with reference to FIG. 1. FIG. 1 is a block diagram illustrating a configuration of the vehicle according to the embodiment. In FIG. 1, illustration of members that are not directly related to the present invention is omitted, as occasion demands.

In FIG. 1, the vehicle 1 is provided with an electronic control unit (ECU) 11, a brake ECU 12, a battery ECU 13, a battery 14, an inverter 15, a motor generator 16, and a reduction mechanism 17.

The motor generator 16, which is one example of the "power source" according to the present invention, is provided with a function as an electric motor that converts supplied electric power to mechanical power, and a function as a generator that converts inputted mechanical power to electric power. Rotary power outputted from the motor generator 16 is transmitted to drive wheels WL via a reduction mechanism 17.

The inverter 15 is configured to convert direct current (DC) power supplied from the battery 14 to alternating current (AC) power and supply it to the motor generator 16. Moreover, the inverter 15 is configured to convert the AC power (i.e. regenerative power) from the motor generator 16 to DC power and collect it in the battery 14. The electric power supply and the electric power collection by the inverter 15 are controlled by the ECU 11.

The battery ECU 13 monitors, for example, temperature, voltage, a charge/discharge current value, and the like of the battery 14, and calculates a state of charge (SOC) and charge/discharge power of the battery from the above information. The battery ECU 13 transmits signals indicating the SOC and the charge/discharge power of the battery 14 to the ECU 11.

A cruise control apparatus 100, which is mounted on the vehicle 1 as configured above, is provided with the ECU 11, an accelerator sensor 21, and a vehicle speed sensor 22. In other words, in the embodiment, a partial function of the ECU 11, which performs various electronic controls associated with the vehicle 1, is used as a part of the cruise control apparatus 100.

The ECU 11 as a part of the cruise control apparatus 100 is configured to perform an intermittent operation mode. The intermittent operation mode in the embodiment is realized by cruising the vehicle 1 in a predetermined vehicle speed range including a vehicle speed that is determined according to an accelerator opening degree when the intermittent operation mode is started, while alternately repeating drive and stop of the motor generator 16.

Particularly in the embodiment, the ECU 11 as a part of the cruise control apparatus 100 starts a determination period, which is a period for determining whether or not to continue the intermittent operation mode on condition that a change amount of an accelerator opening degree caused by an accelerator operation by a driver of the vehicle 1 exceeds a predetermined change amount, during implementation of the intermittent operation mode.

Then, if it is determined that the intermittent operation mode is to be continued according to a change width of the accelerator opening degree, which is an integrated value of the change amount of the accelerator opening degree obtained in the determination period, the ECU 11 sets an accelerator following period, which is a period for allowing the driver's accelerator operation to follow torque of the vehicle 1 after the end of the determination period.

Figure 2:
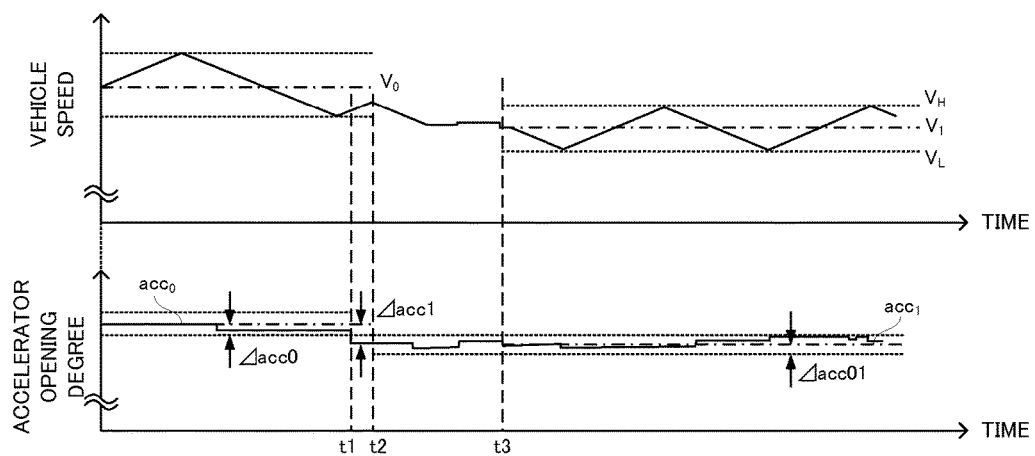
FIG. 2 is a diagram illustrating one example of respective time variations of a vehicle speed and an accelerator opening degree.
Figure 3:
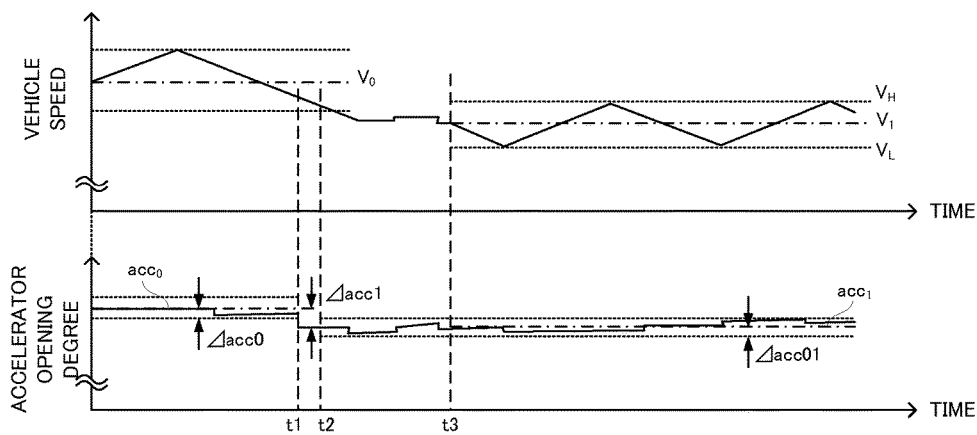
FIG. 3 is a diagram illustrating another example of respective time variations of the vehicle speed and the accelerator opening degree.

Now, with reference to FIG. 2 and FIG. 3, the operation of the ECU 11 will be explained, more specifically. FIG. 2 is a diagram illustrating one example of respective time variations of a vehicle speed and the accelerator opening degree. FIG. 3 is a diagram illustrating another example of respective time variations of the vehicle speed and the accelerator opening degree. In FIG. 2 and FIG. 3, it is assumed that the intermittent operation mode is performed until a time point t1.

In FIG. 2, the change amount of the accelerator opening degree caused by the accelerator operation by the driver of the vehicle 1 exceeds a predetermined change amount $\Delta acc0$ at the time point t1, and the ECU 11 thus starts the determination period. Until the time point t1, the intermittent operation mode is maintained because the change amount of the accelerator opening degree is within the predetermined change amount $\Delta acc0$.

The ECU 11 determines whether or not to continue the intermittent operation mode according to the change width of the accelerator opening degree in the determination period (or from the time point t1 to a time point t2 herein). In the embodiment, an explanation will be given on the assumption that it is determined that the intermittent operation mode is to be continued.

If it is determined that the intermittent operation mode is to be continued, the ECU 11 sets the accelerator following period (or from the time point t2 to a time point t3 herein). The length of the accelerator following period is changed according to the vehicle speed detected by the vehicle speed sensor 22. Specifically, the accelerator following period is set to be longer with increasing the vehicle speed.

In the accelerator following period, the ECU 11 controls the motor generator 16 or the like to set a vehicle speed $V_1$ corresponding to an absolute value acc1 of the accelerator opening degree after the change.

Here, the accelerator opening degree decreases (refer to a lower part of FIG. 2), but the vehicle speed changes to increase during the determination period (refer to an upper part of FIG. 2). The ECU 11 thus, for example, stops the motor generator 16 after the end of the determination period (i.e. after the time point t2), thereby allowing the vehicle 1 to coast (or perform inertia cruise) to reduce the vehicle speed. The ECU 11 then controls the motor generator 16 and the like to set the vehicle speed $V_1$ corresponding to the absolute value acc1 of the accelerator opening degree.

After the accelerator following period (or after the time point t3 herein), the ECU 11 performs the intermittent operation mode to cruise the vehicle 1 in a range of a vehicle speed $V_L$ and a vehicle speed $V_H$ centered on the vehicle speed $V_1$. At this time, the ECU 11 continues the intermittent operation mode if the change amount of the accelerator opening degree is less than or equal to a change amount $\Delta acc01$.

In FIG. 3, the vehicle speed decreases during the determination period (or from the time point t1 to the time point t2 in FIG. 3), and the ECU 11 thus, for example, reduces the vehicle speed without operating the motor generator 16 in such a manner that the vehicle speed approaches the vehicle speed $V_1$ corresponding to the absolute value acc1 of the accelerator opening degree after the change.

Particularly in the embodiment, the vehicle speed is reduced by the coasting in the accelerator following period. It is thus possible to realize low fuel consumption cruise, which is extremely useful in practice.

A cruise control process, which is performed by the cruise control apparatus 100 as configured above, will be explained with reference to a flowchart in FIG. 4. The cruise control process is performed mainly during the cruise of the vehicle 1.

Figure 4:
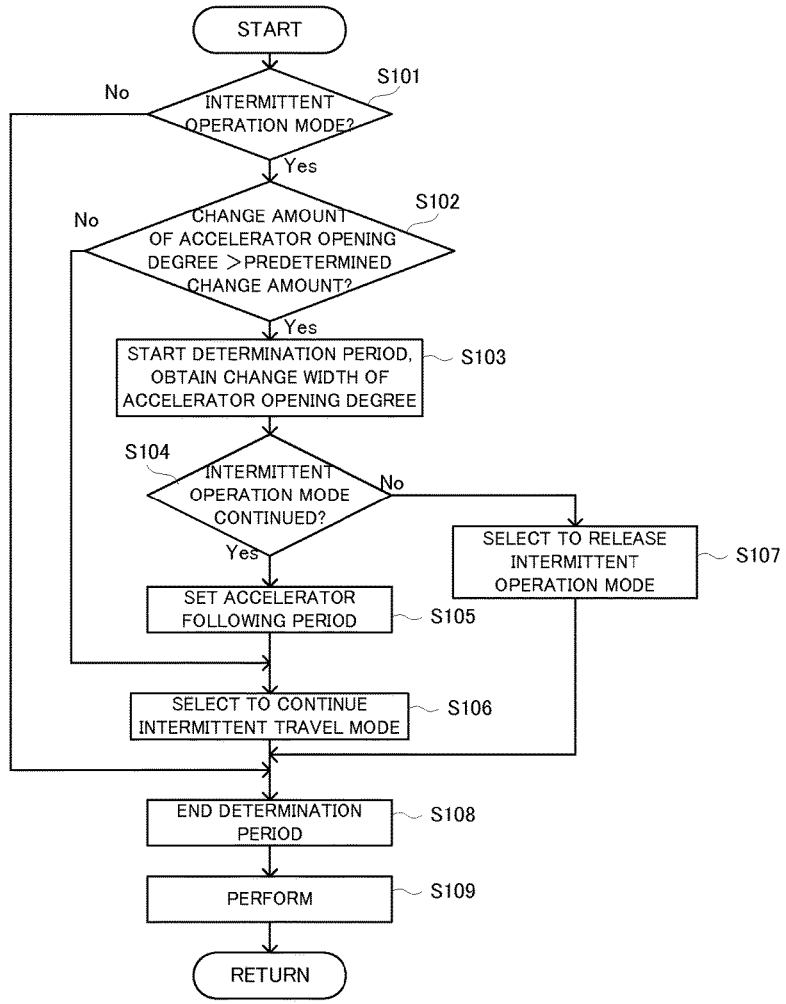
FIG. 4 is a flowchart illustrating a main part of a cruise control process according to the embodiment.

In FIG. 4, firstly, the ECU 11 determines whether or not the vehicle 1 is in the intermittent operation mode (step S101). If it is determined that the vehicle 1 is not in the intermittent operation mode (the step S101: No), the process is returned and is in a standby state until a predetermined time passes. On the other hand, if it is determined that the vehicle 1 is in the intermittent operation mode (the step S101: Yes), the ECU 11 determines whether or not the change amount of the accelerator opening degree is greater than the predetermined change amount (step S102).

If it is determined that the change amount of the accelerator opening degree is less than or equal to the predetermined change amount (the step S102: No), the ECU 11 continues the intermittent operation mode (step S106). On the other hand, if it is determined that the change amount of the accelerator opening degree is greater than the predetermined change amount (the step S102: Yes), the ECU 11 starts the determination period and obtains the change width of the accelerator opening degree in the determination period (step S103).

The ECU 11 then determines whether or not to continue the intermittent operation mode on the basis of the obtained change width of the accelerator opening degree (step S104). If it is determined that the intermittent operation mode is to be continued (the step S104: Yes), the ECU 11 sets the accelerator following period according to the vehicle speed (step S105), and selects to continue the intermittent operation mode (e.g. maintains an intermittent operation mode flag in an ON state) (step S106).

The ECU 11 then ends the determination period (step S108), and controls the motor generator 16 and the like to set the vehicle speed corresponding to the current accelerator opening degree, and performs the intermittent operation mode after the accelerator following period (step S109).

In the process in the step S104, if it is determined that the intermittent operation mode is not to be continued (the step S104: No), the ECU 11 selects to release or cancel the intermittent operation mode (e.g. sets the intermittent operation mode flag to be in an OFF state) (step S107). The ECU 11 then ends the determination period (step S108), and perform the release or cancellation of the intermittent operation mode (step S109).

In the embodiment described above, the vehicle 1 that uses only the motor generator 16 as the power source is exemplified as one example; however, the present invention can be also applied to a hybrid vehicle provided with an engine and a motor as the power source, and a vehicle provided with an engine as the power source.

The "ECU 11" according to the embodiment is one example of the "controlling device" according to the present invention.

The present invention is not limited to the aforementioned embodiments, but various changes may be made, if desired, without departing from the essence or spirit of the invention which can be read from the claims and the entire specification. A cruise control apparatus which involves such changes is also intended to be within the technical scope of the present invention.

DESCRIPTION OF REFERENCE NUMERALS AND LETTERS 1 vehicle
11 ECU
16 motor generator
21 accelerator sensor
22 vehicle speed sensor
100 cruise control apparatus

The invention claimed is:

1. A cruise control apparatus configured to perform an intermittent operation mode, which is a mode for cruising a vehicle in a predetermined vehicle speed range including a vehicle speed that is determined according to an accelerator opening degree while alternately repeating transmission and non-transmission of rotary power generated on a power source of the vehicle to drive wheels, said cruise control apparatus comprising:
a controlling device programmed to:
determine whether a change amount of the accelerator opening degree caused by an accelerator operation by a driver of the vehicle exceeds a predetermined change amount, start a determination period, which is a period for determining whether or not to continue the intermittent operation mode,
on condition that the change amount of the accelerator opening degree caused by the accelerator operation by the driver of the vehicle exceeds the predetermined change amount, during implementation of the intermittent operation mode, set an accelerator following period, which is a period for changing a predetermined speed of the intermittent operation mode in accordance with the driver's accelerator operation, and if the change amount of the accelerator opening degree does not exceed the predetermined change amount, not set the accelerator following period,
after an end of the determination period, if it is determined that the intermittent operation mode is to be continued according to a change width of the accelerator opening degree in the determination period, which is an integrated value of the change amount of the accelerator opening degree obtained in the determination period, and
perform the intermittent mode after said accelerator following period;
wherein the determination period for determining whether or not to continue the intermittent operation mode, starts when the change amount of the accelerator opening degree exceeds a predetermined change amount, and
after an end of the determination period, if it is determined that that the intermittent operation mode is to be continued, the accelerator following period, which is a period for changing a predetermined speed of the intermittent operation mode in accordance with a driver's accelerator operation, is set.

2. The cruise control apparatus according to claim 1, wherein said controlling device is programmed to change the accelerator following period according to a vehicle speed of the vehicle.

* * * * *